(12) United States Patent
Lerner (10) Patent No.: US 12,332,067 B2
(45) Date of Patent: Jun. 17, 2025

(54) EV CHARGING STATION OPTIMIZATION

(71) Applicant: FORD GLOBAL TECHNOLOGIES, LLC, Dearborn, MI (US)

(72) Inventor: Jeremy Lerner, Southfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 303 days.

(21) Appl. No.: 17/734,594

(22) Filed: May 2, 2022

(65) Prior Publication Data

US 2023/0349705 A1 Nov. 2, 2023

(51) Int. Cl.
*G01C 21/34* (2006.01)
*B60L 53/00* (2019.01)
*G06Q 10/047* (2023.01)

(52) U.S. Cl.
CPC ....... *G01C 21/3476* (2013.01); *G06Q 10/047* (2013.01); *B60L 53/00* (2019.02)

(58) Field of Classification Search
CPC .............. B60L 53/00; B60L 2240/622; B60L 2260/52; B60L 53/63; B60L 53/68; B60L 53/67; B60L 53/66; G01C 21/3476; G01C 21/3469; G06Q 10/047; G08C 17/02; Y02T 10/70; Y02T 10/7072; Y02T 90/12
See application file for complete search history.

(56) References Cited

U.S. PATENT DOCUMENTS

| | | | |
|---|---|---|---|
| 9,132,742 B2 | 9/2015 | Dai et al. | |
| 10,083,413 B2 | 9/2018 | Sun et al. | |
| 2007/0294031 A1* | 12/2007 | Brinton | G08G 1/096844 701/527 |
| 2013/0317790 A1* | 11/2013 | Fukubayashi | B60L 3/12 703/1 |
| 2015/0045985 A1* | 2/2015 | Yenamandra | G01C 21/3469 701/1 |
| 2017/0276503 A1* | 9/2017 | Oh | G01C 21/3469 |
| 2021/0107372 A1 | 4/2021 | Viswanathan et al. | |

(Continued)

FOREIGN PATENT DOCUMENTS

| | | | | |
|---|---|---|---|---|
| CN | 104331743 A | * | 2/2015 | ............. G06N 3/006 |
| CN | 114742340 A | * | 7/2022 | |

(Continued)

OTHER PUBLICATIONS

CN-104331743-A translation (Year: 2015).*

(Continued)

*Primary Examiner* — Kyle T Johnson
(74) *Attorney, Agent, or Firm* — Joseph Zane; Brooks Kushman P.C.

(57) ABSTRACT

Optimizing a charger network is provided. For each vehicle trip of a plurality of vehicle trips defined by trip information maintained to a storage, a set of possible routes from an origin location of the respective vehicle trip to a destination location of the respective vehicle trip is generated using a routing algorithm. Best routes are identified based on the set of possible routes. Individual charger recommendations are identified using the best routes. Collective charger recommendations across the plurality of vehicle trips based on the individual charger recommendations. The collective charger recommendations are utilized to optimize the charger network.

21 Claims, 9 Drawing Sheets

(56) References Cited

U.S. PATENT DOCUMENTS

2023/0152108 A1* 5/2023 Vreeland ............ G01C 21/3469
　　　　　　　　　　　　　　　　　　　　　701/420
2023/0349705 A1* 11/2023 Lerner ............... G01C 21/3476

FOREIGN PATENT DOCUMENTS

CN　　　116049564 A　*　5/2023
CN　　　116681196 A　*　9/2023

OTHER PUBLICATIONS

CN-116049564-A translation (Year: 2023).*
Determining_Electric_Vehicle_Charging_Station_Locations_Suitability (Year: 2021).*
An Electric vehicle corridor model in a dense city with applications to charging location (Year: 2021).*
CN-114742340-A translation (Year: 2022).*
CN-116681196-A translation (Year: 2023).*
Electric_vehicle_route_planning_using_real-world_charging_infrastructure_in_Germany (Year: 2021).*
Optimal_Placement_of_Electric_Vehicle_Charging_Stations_in_the_Active_Distribution_Network (Year: 2020).*
System_Optimization_for_Dynamic_Wireless_Charging_Electric_Vehicles_Operating (Year: 2018).*
Tsigdinos et al., Determining Electric Vehicle Charging Station Location Suitability: A Qualitative Study of Greek Stakeholders Employing Thematic Analysis and Analytical Hierarchy Process, Sustainability 2021, vol. 13, Issue 4, 2298.

* cited by examiner

EV CHARGING STATION OPTIMIZATION

TECHNICAL FIELD

Aspects of the disclosure relate to charging station location optimization.

BACKGROUND

The increased availability of electric vehicles has increased the amount of charging stations that are required for vehicles to use. Charging stations may have different attributes, such as charger plug type, maximum charge speed, cost to use, availability, reliability, and location.

SUMMARY

In one or more illustrative examples, a system for optimizing a charger network is provided. The system includes a memory configured to store trip information and a charger locations server including a hardware processor. The charger locations server is configured to execute a charger location service to, for each vehicle trip of a plurality of vehicle trips defined by the trip information, generate, using a routing algorithm, a set of possible routes from an origin location of the respective vehicle trip to a destination location of the respective vehicle trip, identify best routes based on the set of possible routes, and identify individual charger recommendations using the best routes. The charger locations server is further configured to identify collective charger recommendations across the plurality of vehicle trips based on the individual charger recommendations, and utilize the collective charger recommendations to optimize the charger network.

In one or more illustrative examples, a method for optimizing a charger network is provided. For each vehicle trip of a plurality of vehicle trips defined by trip information maintained to a storage, a set of possible routes from an origin location of the respective vehicle trip to a destination location of the respective vehicle trip is generated using a routing algorithm. Best routes are identified based on the set of possible routes. Individual charger recommendations are identified using the best routes. Collective charger recommendations across the plurality of vehicle trips based on the individual charger recommendations. The collective charger recommendations are utilized to optimize the charger network.

In one or more illustrative examples, a non-transitory computer readable medium includes instructions for optimizing a charger network that, when executed by a hardware processor of a charger locations server, causes the charger locations server to perform operations including to, for each vehicle trip of a plurality of vehicle trips defined by trip information maintained to a storage generate, using a routing algorithm, a set of possible routes from an origin location of the respective vehicle trip to a destination location of the respective vehicle trip, identify best routes based on the set of possible routes, and identify individual charger recommendations using the best routes, identify collective charger recommendations across the plurality of vehicle trips based on the individual charger recommendations, and utilize the collective charger recommendations to optimize the charger network.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A system may be configured to utilize historical connected vehicle routes to discover roadways where many distinct vehicles and/or vehicle trips have not encountered an open electric vehicle (EV) charging station that fits the requirements of the vehicle (e.g., the type of charger) in the last n miles and will not encounter one in the next n miles. In an example, the system may flag locations where many trips have traversed for at least n miles without encountering an EV charging station and the trip will continue on for at least n miles without encountering an EV charging station. Encounter may be defined in many ways. For example, an encounter may be limited to a situation in which a trip passes an EV charging station on the roadway that was travelled (or even on the side of the road that the trip took place). In another example, an encounter may be defined to include all EV charging stations within m miles of the trip route (e.g., a 2-mile detour).

The system may be further configured to identify unique vehicle and unique trip counts for various areas that are identified as exhibiting this phenomenon (of no chargers prior to or ahead of a location along a route). For example, one location may have 100 instances of vehicle encounters but few unique vehicles, e.g., one or two, so the population that a new EV charger at this location would serve is small. For example, another location may have fewer instances of vehicle encounters, e.g., 90 instances, but a greater amount of unique vehicles, e.g., 80 unique vehicles. Thus, many more vehicles would potentially be served by having a new charger at the location having more unique vehicle encounters.

Further EV charger metadata, such as estimated or historical wait times/utilization by EVs, may be utilized to further discover locations where many vehicles have not and will not encounter an available EV charging station in the last or next n miles. Responsive to these locations being identified, new EV chargers (and/or changing the operating hours of existing EV chargers) may be prioritized based on the relative needs exhibited from the routed trip dataset. Locations where vehicles are far from EV chargers along their route path may be identifiable and EV chargers may be built in those locations according to the determined need.

Figure 1:
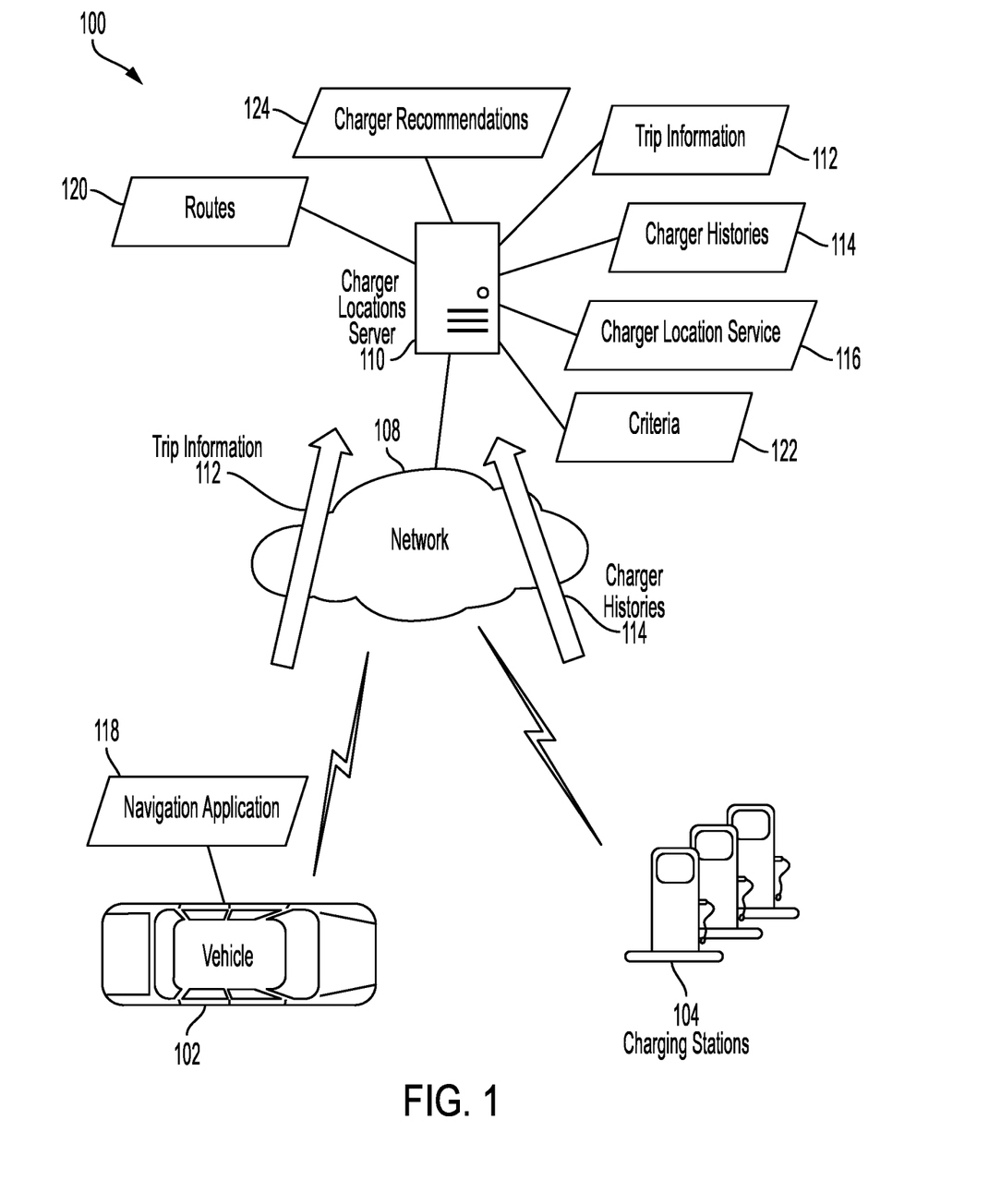
FIG. 1 illustrates an example system for utilizing best routes to generate charger recommendations to optimize a charging network of charging stations.

FIG. 1 illustrates an example system 100 for optimizing network of charging stations 104. Vehicles 102, mobile devices 106, charger locations server 110, and charging stations 104 of the system 100 may be configured to communicate over a communications network 108. The charger locations server 110 may be configured to receive trip information 112 from the vehicles 102 and/or from the mobile devices 106. Using the trip information 112, the charger locations server 110 may be configured to generate likely vehicle routes 120. Using the routes 120, and charger histories 114, the charger locations server 110 may use criteria 122 to identify charger recommendations 124. The charger recommendations 124 may include locations where additional charging stations 104 would be useful and/or where the operation of the charging stations 104 should be adjusted.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be a battery electric vehicle (BEV) powered by a traction battery and one or more electric motors. As a further possibility, the vehicle 102 may be a hybrid electric vehicle powered by both an internal combustion engine, a traction battery, and one or more electric motors. Hybrid vehicles 102 may come in various forms, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs), globally unique identifiers (GUIDs), customer or fleet accounts, etc.

The charging stations 104 may be configured to regulate and manage the transfer of energy between a power source and the vehicle 102. An external power source may provide direct current (DC) or alternating current (AC) electric power to the charging stations 104. The charging stations 104 may, in turn, have a charge connector for plugging into a respective charge port of the vehicle 102. The charge port may be any type of port configured to transfer power from the charging stations 104 to the vehicle 102. Alternatively, the charging stations 104 may be configured to transfer power using other approaches, such as a wireless inductive coupling. However connected, the charging stations 104 may include circuitry and controls to regulate and manage the transfer of energy between the power source and the vehicle 102.

The mobile device 106 may be any of various types of portable computing device, such as cellular phones, tablet computers, smart watches, laptop computers, portable music players, or other devices having processing and communications capabilities. The mobile device 106 may include one or more processors configured to execute computer instructions, and a storage medium on which the computer-executable instructions and/or data may be maintained.

The mobile device 106 may further include various wireless transceivers, such as a short-range wireless technology BLUETOOTH® or BLUETOOTH Low Energy (BLE) transceiver, as well as a transceiver for communication over the communications network 108. The communications network 108 may include one or more interconnected communication networks such as the Internet, a cable television distribution network, a satellite link network, a local area network, and a telephone network, as some non-limiting examples. The vehicle 102 may also include a telematics control unit (TCU). The TCU may include network hardware configured to facilitate communication between the vehicle 102 and other devices of the system 100. For example, the TCU may include or otherwise access a cellular modem configured to facilitate communication with the communications network 108.

The charger locations server 110 may be an example of a networked computing device that is accessible to the vehicles 102, charging stations 104, and/or mobile devices 106 over the communications network 108. The charger locations server 110 may be configured to receive various data from the elements of the system 100.

In an example, the charger locations server 110 may be configured to receive trip information 112. The trip information 112 may include, for example, start points and end points for routes 120 that are traversed by the vehicles 102. The trip information 112 may include additional information as well, such as time spent traveling, distance traveled, etc. Due to storage constraints and/or privacy issues, the actual routes 120 taken by the vehicles 102 may not be stored (however use of the actual routes 120 is possible).

In another example, the charger locations server 110 may be configured to receive charger histories 114 from the charging stations 104. The charger histories 114 may include information with respect to vehicle 102 usage of the charging stations 104. This information may include, as some non-limiting examples: a time at which a charging station 104 begins to charge a vehicle 102, a time at which a charging station 104 stops to charging the vehicle 102, average charge rate for the charge of the vehicle 102, charge over time rate for the charge of the vehicle 102, an identifier of the charging station 104, an identifier of the vehicle 102, whether an issue occurred during the charge of the vehicle 102, cost per kWh for the charge, etc. The charger histories 114 may also include information regarding the vehicles 102 that utilize the charging stations 104. For instance, the charger histories 114 may also include identifiers of the vehicles 102 (e.g., VIN, GUID, user account, etc.), make, model, and/or type of the vehicle 102, age of the vehicle 102, battery health of the vehicle 102, mileage of the vehicle 102, initial charge level of the vehicle 102, ending charge level of the vehicle 102. The charger histories 114 may be used by the charger locations server 110, in an example, to determine estimated or historical wait times for utilization of the charging stations 104 by the vehicles 102.

A charger location service 116 may be an example of an application executed by the charger locations server 110. As explained in further detail herein, the charger location service 116 may be configured to receive trip information 112.

The trip information 112 may be used to determine routes 120 traversed by the vehicles 102. The charger location service 116 may also be configured to receive the charger histories 114.

The charger location service 116 may additionally receive criteria 122. The criteria 122 may indicate rules for the system 100 to apply to determine where additional charging stations 104 should be made available. For instance, the criteria 122 may indicate Using the routed trips and the charger histories 114, the charger location service 116 may utilize criteria 122 to determine charger recommendations 124 for potential new charging stations 104 or adjustments to operation of the existing charging stations 104. The criteria 122 may include indications for flagging that a charging station 104 may be desirable with respect to a route 120, such as a closest distance from a route 120 to a charging station 104, a distance along a route 120 before the closest distance to the vehicle 102, a distance along a route 120 after the closest distance to the vehicle 102, etc. The criteria 122 may also include indications for flagging that a charging station 104 may be desirable with respect to an aggregation of vehicle 102 traversals of routes 120, such as a quantity of traversals of a road segment desiring charging stations 104, a unique quantity of vehicles 102 desiring charging stations 104, etc.

Figure 2:
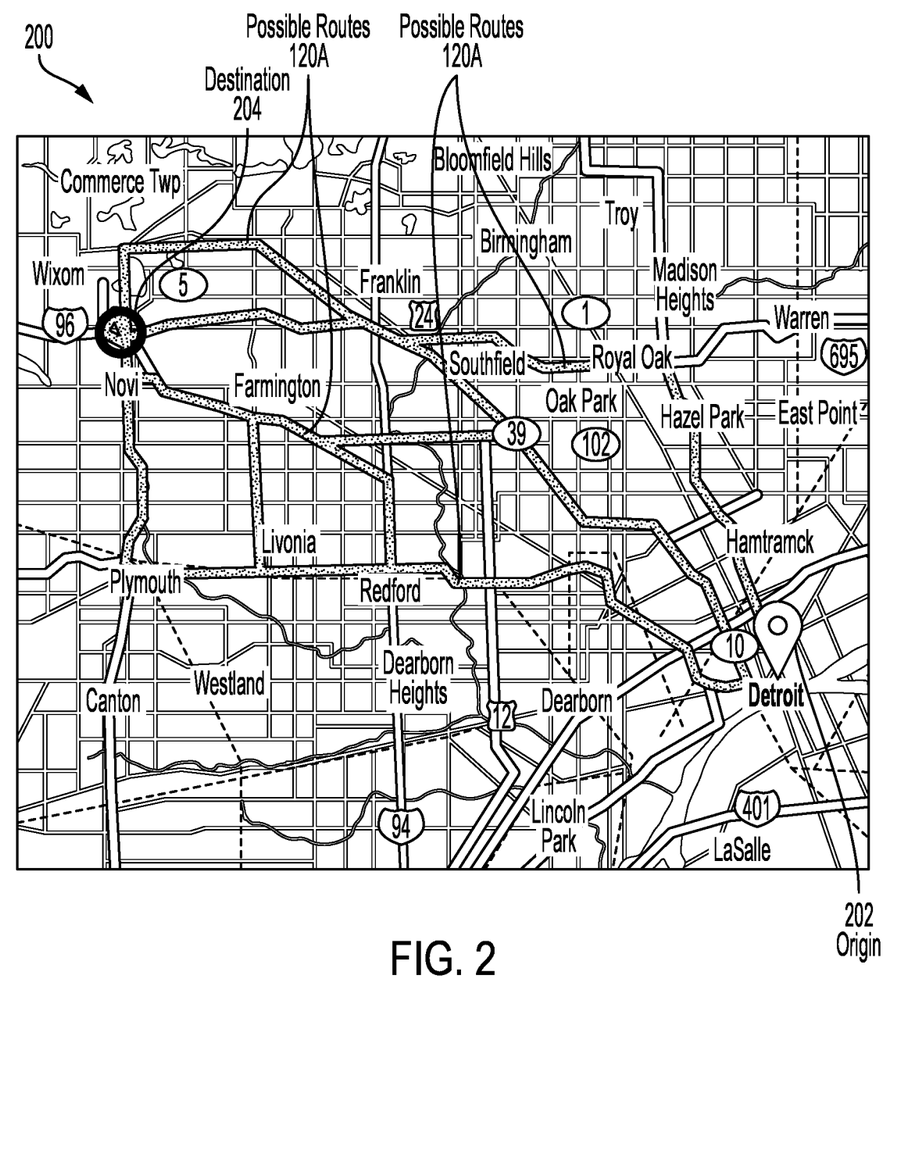
FIG. 2 illustrates an example map of a set of possible routes for an example trip of the trip information.

FIG. 2 illustrates an example map 200 of a set of possible routes 120A for an example trip of the trip information 112. As shown, the trip may be from an origin location 202 to a destination location 204. The set of possible routes 120A may be determined based on the origin location 202, the destination location 204, and the road segments of the map 200. In an example, the road segments of the map 200 may be assigned weights, such as distances, time to traverse, etc., and the set of possible routes 120A may be determined using a routing algorithm that determines one or more lowest cost routes 120 from the origin location 202 to the destination location 204. Various routing algorithms may be used, such as A*, Dijkstra, etc.

Figure 3:
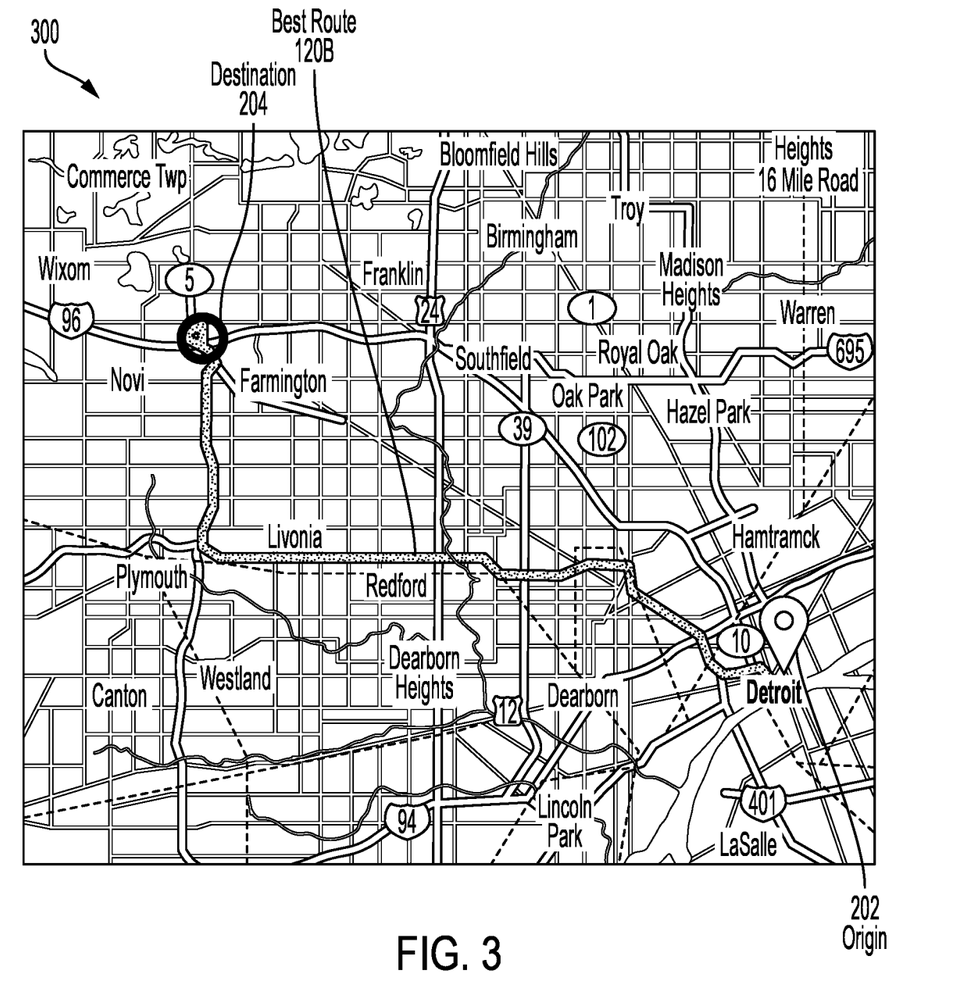
FIG. 3 illustrates an example map showing a best route for the example trip shown in FIG. 2.

FIG. 3 illustrates an example map 300 showing a best route 120B for the example trip shown in FIG. 2. The best route 120B may be determined from the set of possible routes 120A using various criteria 122. In one example, a fit may be performed using additional information from the trip information 112. For instance, if the total time of the trip is defined by the trip information 112, then the best route 120B may be selected as the best route 120B from the set of possible routes 120A whose sum of time to traverse of the segments is closest to the total time of the trip. Additionally or alternately, if the total distance of the trip is defined by the trip information 112, then the best route 120B may be selected as the best route 120B from the set of possible routes 120A whose sum of distance to traverse of the segments is closest to the total distance of the trip.

It should be noted that the best route 120B need not necessarily be the actual path taken by the vehicle 102 for the trip defined by the trip information 112. It should also be noted that while only a single possible route 120A is shown as being selected as being the best route 120B in the illustrated example, in other possibilities more than one possible route 120A from the set of possible routes 120A that is closest to the criteria 122 may be used. In yet a further example, all the possible routes 120A from the set of possible routes 120A may be used as the best route 120B.

Figure 4:
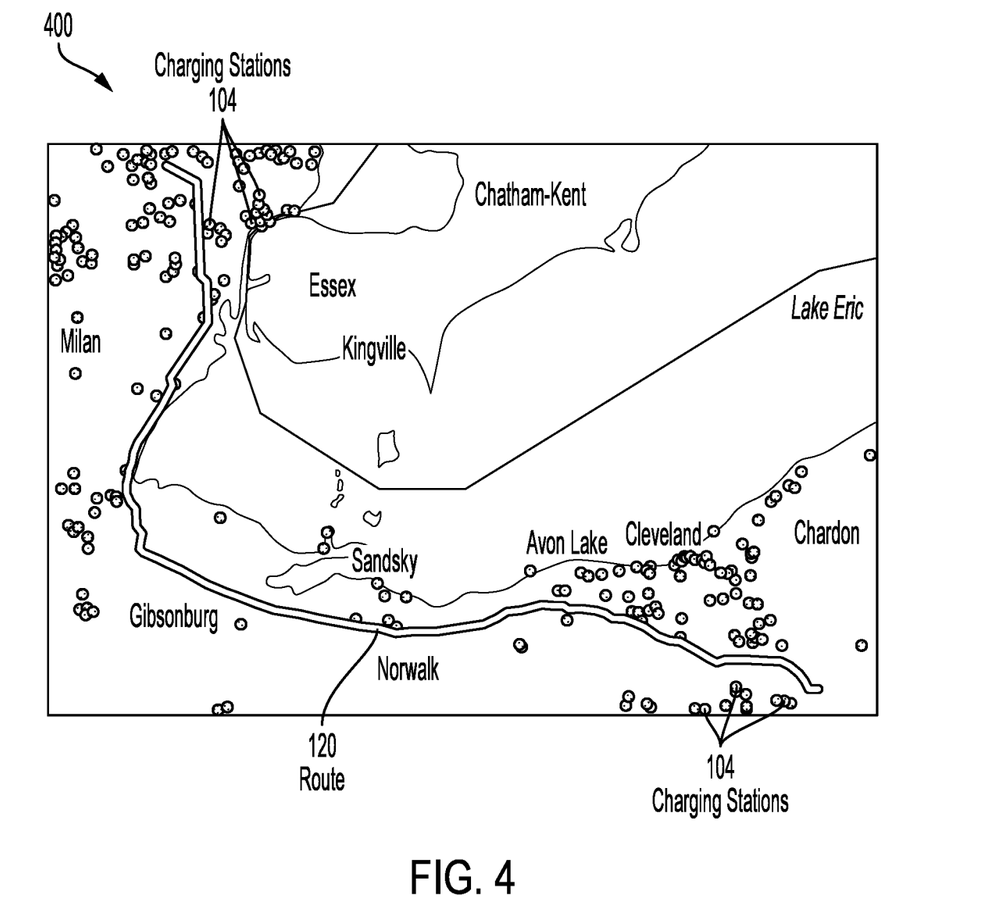
FIG. 4 illustrates an example map of a roadway and charging stations along the roadway.

FIG. 4 illustrates an example map 400 of a route 120 and charging stations 104 along the route 120. As shown, some segments of the route 120 are in closer proximity to charging stations 104 than other segments. However, due to differences in the quantity of vehicles 102 that traverse the segments of the route 120, it may not be clear whether additional charging stations 104 are required and, if so, where those additional charging stations 104 should be placed. The charger location service 116 may accordingly utilize the routed trips to locate road segments along the route 120 where many vehicles 102 experience stretches with no charging stations 104.

Figure 5:
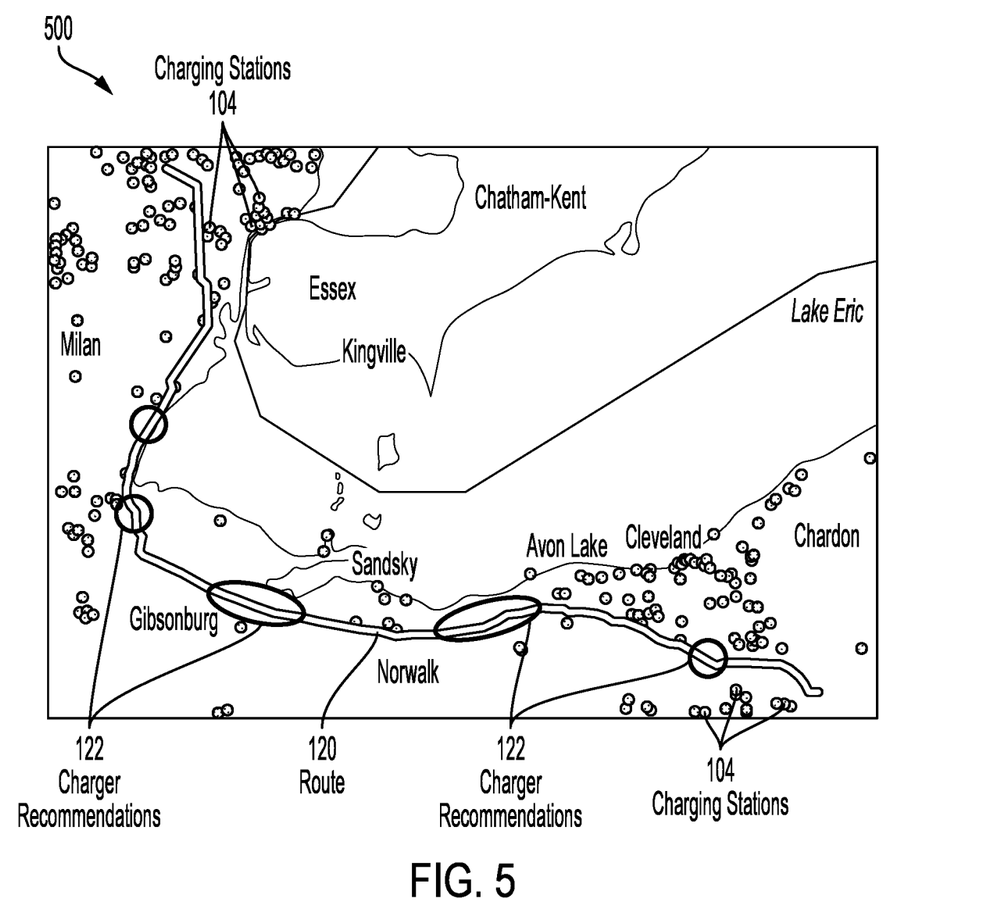
FIG. 5 illustrates an example map of charger recommendations along the roadway.

FIG. 5 illustrates an example map 500 of charger recommendations 124 along the route 120. The charger location service 116 may utilize various criteria 122 to determine the charger recommendations 124. For instance, the charger location service 116 may identify locations where a charging station 104 was passed along the direction of the route 120 from the origin location 202 to the destination location 204 (e.g., the route 120 is within one mile of the charging station 104) more than ten miles prior and will not be encountered for another ten miles.

Figure 6:
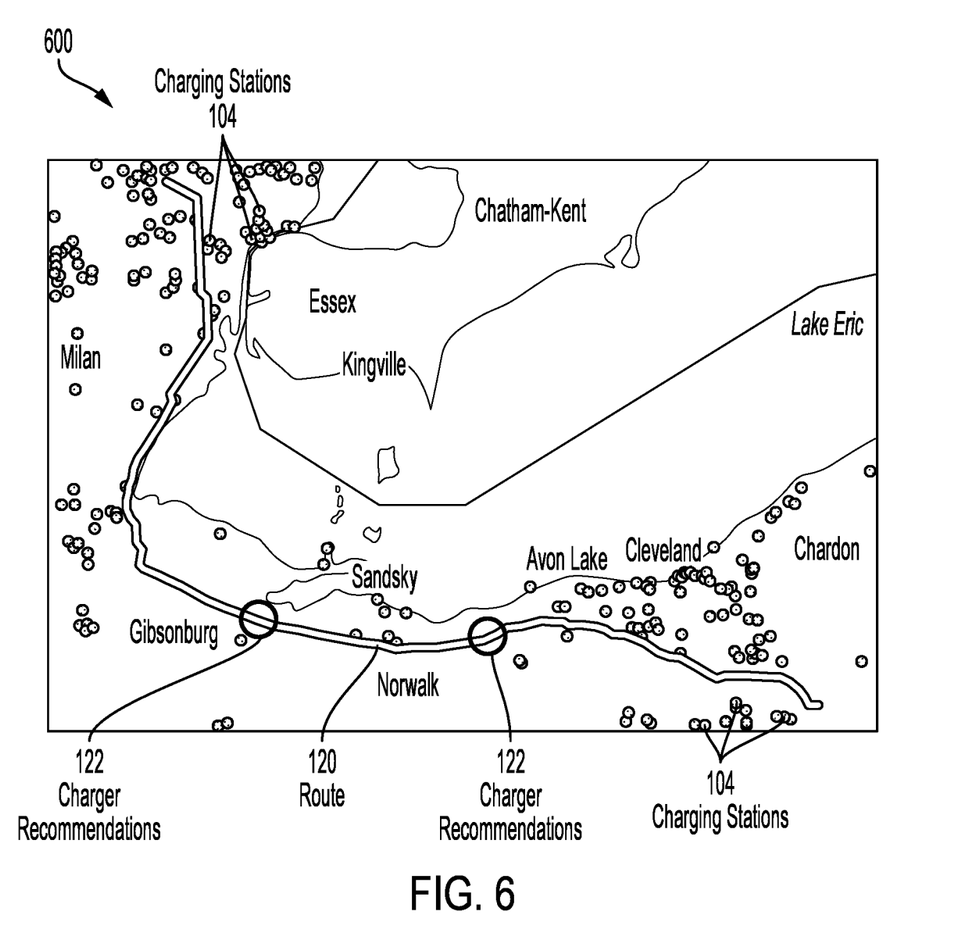
FIG. 6 illustrates an example map of charger recommendations along the roadway based on different criteria.

FIG. 6 illustrates an example map 600 of charger recommendations 124 along the route 120 based on different criteria 122. For instance, the charger location service 116 may identify locations where a charging station 104 was passed along the direction of the route 120 from the origin location 202 to the destination location 204 (e.g., the route 120 is within five mile of the charging station 104) more than twenty miles prior and will not be encountered for another twenty miles.

Figure 7:
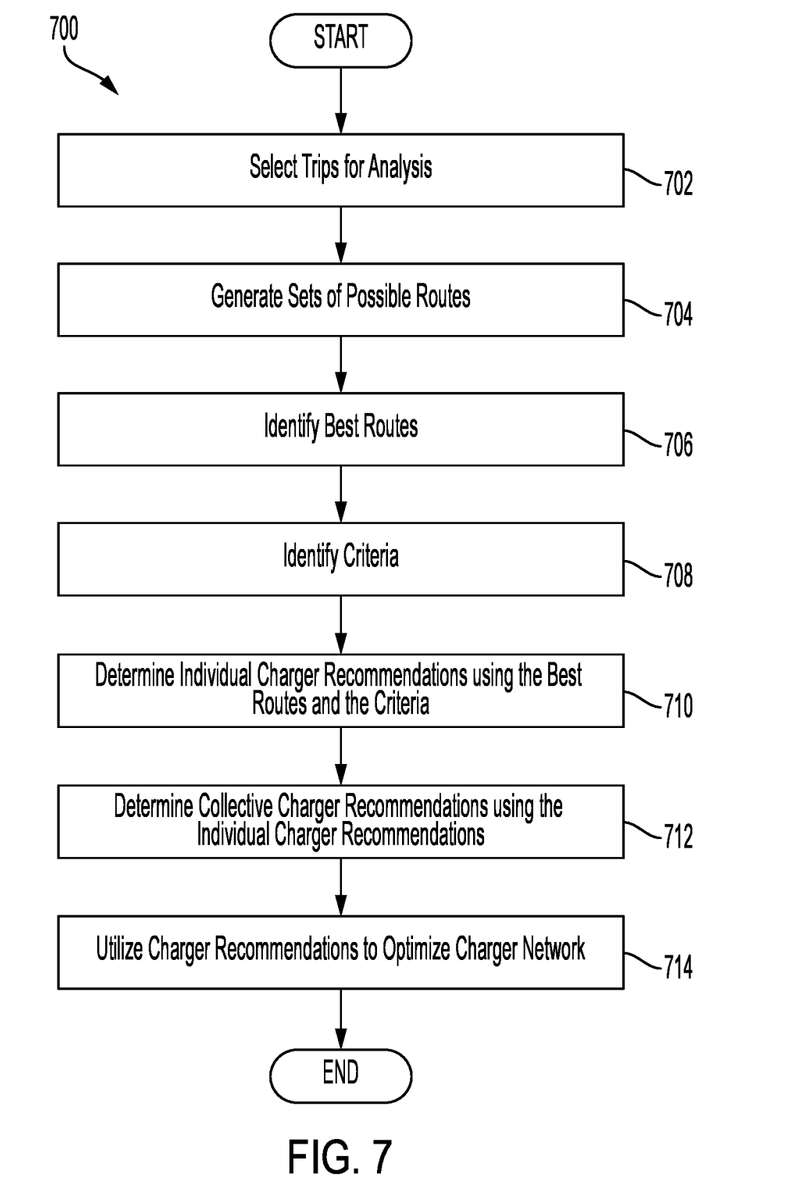
FIG. 7 illustrates an example process for utilizing the best routes to generate charger recommendations to optimize the charging stations of the system.

FIG. 7 illustrates an example process 700 for utilizing the best routes 120B to generate charger recommendations 124 to optimize the charging stations 104 of the system 100. In an example, the process 700 may be performed by the charger location service 116 executed by the charger locations server 110 in the context of the system 100.

At operation 702, the charger location service 116 selects trips from the trip information 112 for analysis. In an example, the charger location service 116 may collect trip information 112 from the vehicles 102. This information may be collected from the vehicles 102 as the vehicles 102 move from origin location 202 to destination location 204. In some examples, the vehicles 102 may periodically provide the trip information 112 to the charger location service 116 via the communications network 108. In other examples, the vehicles 102 may provide the trip information 112 to the charger location service 116 responsive to requests from the charger location service 116. In yet further examples, the charger location service 116 may receive the trip information 112 as anonymized data received from a navigation service provided to the vehicles 102.

At operation 704, the charger location service 116 generates the set of possible routes 120A from the trips selected at operation 702. In an example, as shown with respect to FIG. 2, the set of possible routes 120A may be generated by the charger location service 116 using one or more routing algorithms.

At operation 706, the charger location service 116 identify best routes 120B from the set of possible routes 120A. In an example, as shown with respect to FIG. 3, the best routes 120B may be pulled from the set of possible routes 120A by the charger location service 116 using additional information from the trip information 112. In another example, if additional information is not available, all the possible routes 120A may be used, or in another example, predefined criteria 122 such as shortest path or quickest path may be used to determine the best routes 120B.

At operation 708, the charger location service 116 identifies criteria 122 for determination of the charger recommendations 124. In an example, the charger location services 116 may utilize criteria 122 saved to the charger location services 116 for identification of charger recommendations 124. In another example, the charger location service 116 may receive a request for charger recommendation 124, where the request includes the charger recommendation 124.

At operation 710, the charger location service 116 determines individual charger recommendations 124 using the best routes 120B and the criteria 122. In an example, the charger location service 116 utilizes the criteria 122 to identify whether locations along the best routes 120B that meet the criteria 122 for each of the best routes 120B. For instance, the charger location service 116 may determine whether any charging stations 104 are within a predefined distance of the road segments of the best route 120B. In addition to proximity, charger histories 114 may be utilized to filter the charging stations 104 in proximity or exclude those charging stations 104 that may be too busy to allow for the vehicles 102 to be charged. These locations may be areas where additional charging station 104 capacity may be indicated.

At operation 710, the charger location service 116 determines collective charger recommendations 124. For example, the charger location service 116 may compute statistics with respect to road segments determined at operation 710 where additional charging stations 104 may be required. These statistics may include, for example, total count of best routes 120B for each segment where additional charging stations 104 are indicated, and/or total count of unique vehicles 102 for each segment where additional charging stations 104 are indicated. Based on these counts, the criteria 122 may specify overall locations where the collective charger recommendations 124 indicate additional charging stations 104 are indicated. For instance, the criteria 122 may indicate a quantity of best routes 120B and/or a quantity of unique vehicles 102 that may indicate additional charging stations 104 are required to optimize the charging network.

At operation 714, the charger location service 116 utilizes the charger recommendations 124 to optimize the charger network. In an example, the charger location services 116 may utilize the charger recommendations 124 to direct the charging stations 104 to increase their hours to accommodate the additional capacity indicated by the charger recommendations 124. In another example, the charger location services 116 may direct for additional charging stations 104 to be added along the road segments indicated by the charger recommendations 124 as requiring additional capacity. After operation 714, the process 700 ends.

Variations on the process 700 are possible. In an example, aspects of the type of charging stations 104 that are available may be considered as well. For instance, the charger recommendations 124 may indicate that there is a sufficient quantity of charging stations 104 but insufficient fast charging capacity available.

In another example, battery remaining percentage can be used to determine charger location as well. For instance, the trip information 112 in some examples may include battery remaining capacity in terms of miles, kWh, or other measures for the vehicles 102 traversing the routes 120. Accordingly, the charger location service 116 may in addition to discovering locations where vehicles 102 have not encountered and will not encounter a charging station 104 for at least n miles, the criteria 122 may also include a battery remaining percentage. For example, locations where vehicles 102 have not and will not encounter a charging station 104 for n miles and where the battery remaining percentage is less than a predefined percentage or range may similarly be identified.

Additionally, battery remaining percentage may be simulated based on vehicle 102 average capacity and/or distance traveled. For instance, if a home location of individual vehicles 102 is available and a trip starts at least p hours after the previous trip and is originating from that home location, it may be assumed that the vehicle 102 was fully charged (e.g., overnight). Other assumptions may include a small percentage charge for short stops, etc. Moreover, it should be noted that assumptions can be made about charging behavior to utilize a trip dataset (sourced from any vehicles 102 which are not necessarily EVs) in order to estimate a battery percentage remaining. Therefore, locations where an estimated battery percentage remaining is low can also be considered in discovering locations.

Figure 8:
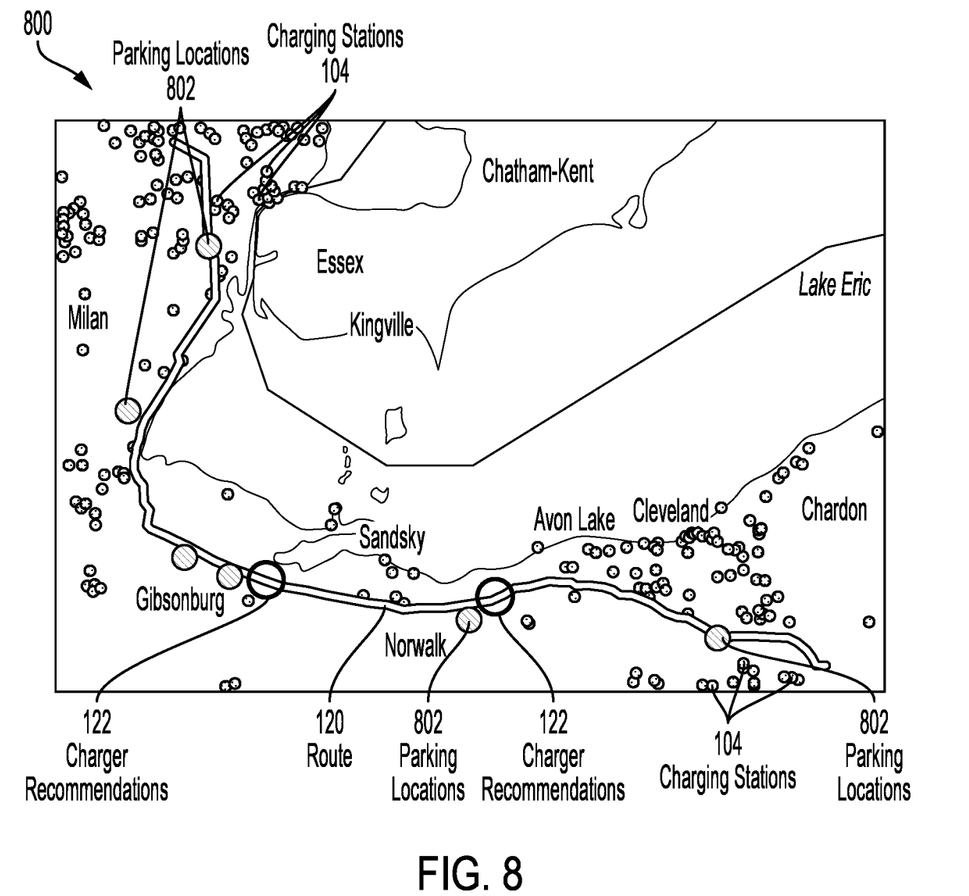
FIG. 8 illustrates an example map of charger recommendations and parking locations along the route.

FIG. 8 illustrates an example map 800 of charger recommendations 124 and parking locations 802 along the route 120. As noted above, the charger location service 116 may identify locations where a charging station 104 was passed along the direction of the route 120 from the origin location 202 to the destination location 204 based on the criteria 122. Similarly, the charger location service 116 may identify parking locations 802 in the charger recommendation 124 where sufficiently many vehicles 102 (as defined by the criteria 122) have parked for a certain time window (e.g., 2 to 5 hours) at locations where, based on the routes 120, charging stations 104 are desired. That is, where vehicles 102 have parked (and not necessarily charged) can be used to determine ideal locations for new charging stations 104 along road segments where charging stations 104 are needed.

Figure 9:
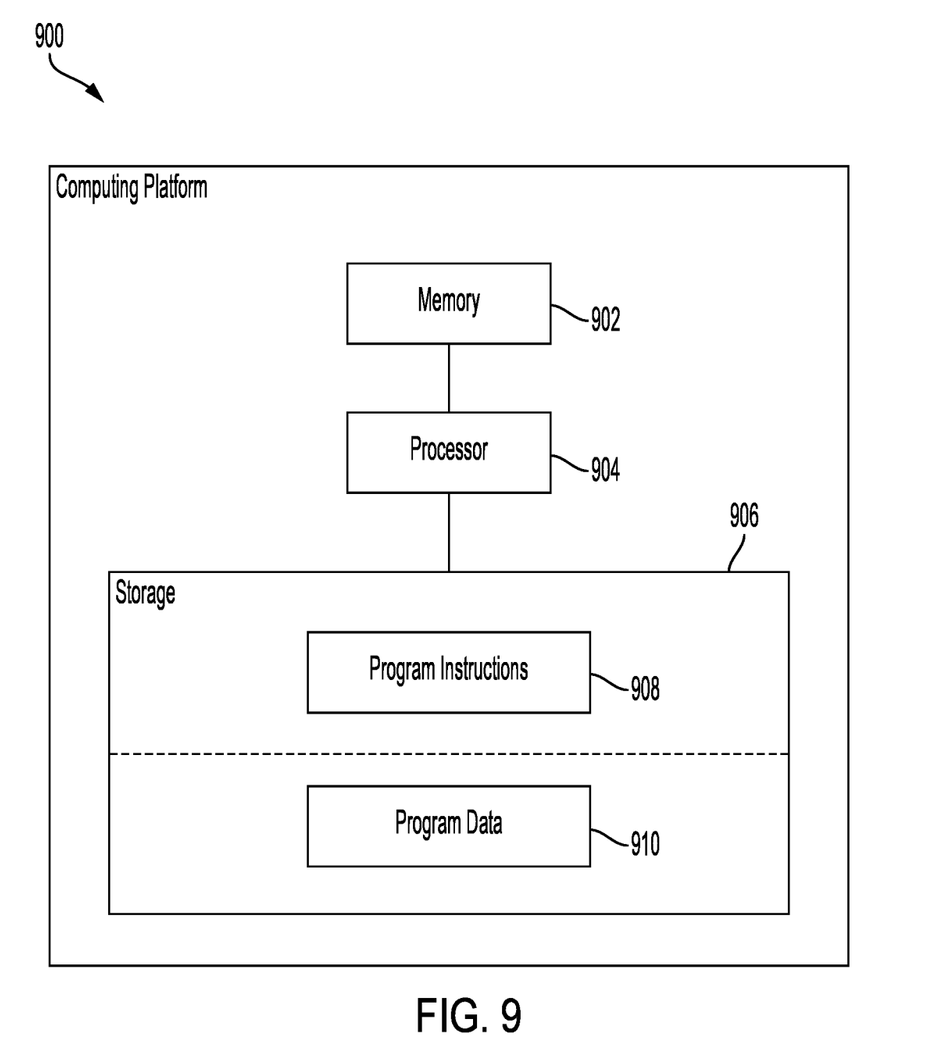
FIG. 9 illustrates an example computing device for utilizing the best routes to generate charger recommendations to optimize the charging stations of the system.

FIG. 9 illustrates an example computing device 902 for utilizing the best routes 120B to generate charger recommendations 124 to optimize the charging stations 104 of the system 100. Referring to FIG. 9, and with reference to FIGS. 1-8, the vehicles 102, charging stations 104, mobile devices 106, communications network 108, and charger locations server 110 may include examples of such computing devices 902. Computing devices 902 generally include computer-executable instructions, such as those of the charger location service 116, where the instructions may be executable by one or more computing devices 902. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the charger histories 114, and charger recommendations 124, may be stored and transmitted using a variety of computer-readable media.

As shown, the computing device 902 may include a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display. As another example, the output device 910 may include an audio device, such as a loudspeaker or headphone. As yet a further example, the output device 910 may include a tactile device, such as a mechanically raiseable device that may, in an example, be configured to display braille or another physical output that may be touched to provide information to a user.

The input device 912 may include any of various devices that enable the computing device 902 to receive control input from users. Examples of suitable input devices 912 that receive human interface inputs may include keyboards, mice, trackballs, touchscreens, microphones, graphics tablets, and the like.

The network devices 908 may each include any of various devices that enable the described components to send and/or receive data from external devices over networks. Examples of suitable network devices 908 include an Ethernet interface, a Wi-Fi transceiver, a cellular transceiver, or a short-range wireless technology BLUETOOTH® or BLE transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for optimizing a charger network, comprising:
  a memory configured to store trip information, the trip information including start points and end points for routes that are traversed by vehicles and corresponding actual distance and/or time information for traversal of the routes, without storing actual routes taken from the start points to the end points by the vehicles; and
  a charger locations server including a hardware processor configured to execute a charger location service to:
    for each vehicle trip of a plurality of vehicle trips defined by the trip information:
      generate, using a routing algorithm, a set of possible routes from an origin location of the respective vehicle trip to a destination location of the respective vehicle trip,
      identify, for each start and end point pair, best routes based on the set of possible routes using the trip information to select the best routes as those closest to the corresponding actual distance and/or time information for the start and end point pair, identify individual charger recommendations using the best routes, identify collective charger recommendations across the plurality of vehicle trips based on the individual charger recommendations, the collective charger recommendations including which road segments of the best routes have a total count of unique vehicles that indicate additional charging stations are required to optimize the charger network, and utilize the collective charger recommendations to optimize the charger network along the indicated road segments.

2. The system of claim 1, wherein the trip information further defines total time of the respective vehicle trip, and the charger locations server is configured to select the best routes from the set of possible routes as those having a traversal time closest to the corresponding actual time of the respective vehicle trip for the start and end point pair.

3. The system of claim 1, wherein the trip information further defines total distance of the respective vehicle trip, and the charger locations server is configured to select the best routes from the set of possible routes as those having a distance closest to the corresponding actual distance of the respective vehicle trip for the start and end point pair.

4. The system of claim 1, wherein to identify a road segment for an individual charger recommendation includes determining that a closest charging station to the road segment is at least a predefined distance away from the road segment along the vehicle trip.

5. The system of claim 4, wherein the collective charger recommendations include the road segment responsive to at least a predefined quantity of vehicle trips indicating individual charger recommendations for that road segment.

6. The system of claim 4, wherein the collective charger recommendations include the road segment responsive to at least a predefined quantity of unique vehicles for the vehicle trips indicating individual charger recommendations for that road segment.

7. The system of claim 4, wherein the charger locations server is further configured to:

identify a parking location in where at least a predefined minimum quantity of vehicles have parked within proximity to the road segment; and indicate, in the collective charger recommendations, the parking location as a candidate for new charging stations along the road segment.

8. A method for system for optimizing a charger network, comprising:

for each vehicle trip of a plurality of vehicle trips defined by trip information maintained to a storage, the trip information including start points and end points for routes that are traversed by vehicles and corresponding actual distance and/or time information for traversal of the routes, without storing actual routes taken from the start points to the end points by the vehicles:

generating, using a routing algorithm, a set of possible routes from an origin location of the respective vehicle trip to a destination location of the respective vehicle trip, identifying, for each start and end point pair, best routes based on the set of possible routes using the trip information to select the best routes as those closest to the corresponding actual distance and/or time information for the start and end point pair, and identifying individual charger recommendations using the best routes, identifying collective charger recommendations across the plurality of vehicle trips based on the individual charger recommendations, the collective charger recommendations including which road segments of the best routes have a total count of unique vehicles that indicate additional charging stations are required to optimize the charger network, and utilizing the collective charger recommendations to optimize the charger network along the indicated road segments.

9. The method of claim 8, wherein the trip information further defines total time of the respective vehicle trip, and further comprising selecting the best routes from the set of possible routes as those having a traversal time closest to the corresponding actual time of the respective vehicle trip for the start and end point pair.

10. The method of claim 8, wherein the trip information further defines total distance of the respective vehicle trip, and further comprising selecting the best routes from the set of possible routes as those having a distance closest to the corresponding actual distance of the respective vehicle trip for the start and end point pair.

11. The method of claim 8, wherein to identify a road segment for an individual charger recommendation includes determining that a closest charging station to the road segment is at least a predefined distance away from the road segment along the vehicle trip.

12. The method of claim 11, wherein the collective charger recommendations include the road segment responsive to at least a predefined quantity of vehicle trips indicating individual charger recommendations for that road segment.

13. The method of claim 11, wherein the collective charger recommendations include the road segment responsive to at least a predefined quantity of unique vehicles for the vehicle trips indicating individual charger recommendations for that road segment.

14. The method of claim 11, further comprising:

identifying a parking location in where at least a predefined minimum quantity of vehicles have parked within proximity to the road segment; and indicating, in the collective charger recommendations, the parking location as a candidate for new charging stations along the road segment.

15. A non-transitory computer readable medium comprising instructions for optimizing a charger network that, when executed by a hardware processor of a charger locations server, causes the charger locations server to perform operations including to:

for each vehicle trip of a plurality of vehicle trips defined by trip information maintained to a storage, the trip information including start points and end points for routes that are traversed by vehicles and corresponding actual distance and/or time information for traversal of the routes, without storing actual routes taken from the start points to the end points by the vehicles:

generate, using a routing algorithm, a set of possible routes from an origin location of the respective vehicle trip to a destination location of the respective vehicle trip, identify, for each start and end point pair, best routes based on the set of possible routes using the trip information to select the best routes as those closest to the corresponding actual distance and/or time information for the start and end point pair, and identify individual charger recommendations using the best routes, identify collective charger recommendations across the plurality of vehicle trips based on the individual charger recommendations, the collective charger recommendations including which road segments of the best routes have a total count of unique vehicles that indicate additional charging stations are required to optimize the charger network, and utilize the collective charger recommendations to optimize the charger network along the indicated road segments.

16. The medium of claim 15, wherein the trip information further defines total time of the respective vehicle trip, and further comprising instructions that, when executed by the hardware processor, cause the charger locations server to perform operations including to select the best routes from the set of possible routes as those having a traversal time closest to the corresponding actual time of the respective vehicle trip for the start and end point pair.

17. The medium of claim 15, wherein the trip information further defines total distance of the respective vehicle trip, and further comprising instructions that, when executed by the hardware processor, cause the charger locations server to perform operations including to select the best routes from the set of possible routes as those having a distance closest to the corresponding actual distance of the respective vehicle trip for the start and end point pair.

18. The medium of claim 15, wherein to identify a road segment for an individual charger recommendation includes determining that a closest charging station to the road segment is at least a predefined distance away from the road segment along the vehicle trip.

19. The medium of claim 18, wherein the collective charger recommendations include the road segment responsive to at least a predefined quantity of vehicle trips indicating individual charger recommendations for that road segment.

20. The medium of claim 18, wherein the collective charger recommendations include the road segment responsive to at least a predefined quantity of unique vehicles for the vehicle trips indicating individual charger recommendations for that road segment.

21. The medium of claim 18, further comprising instructions that, when executed by the hardware processor, cause the charger locations server to perform operations including to:

identify a parking location in where at least a predefined minimum quantity of vehicles have parked within proximity to the road segment; and indicate, in the collective charger recommendations, the parking location as a candidate for new charging stations along the road segment.

\* \* \* \* \*